(12) United States Patent
Ooba

(10) Patent No.: US 10,437,238 B2
(45) Date of Patent: Oct. 8, 2019

(54) SYSTEM PROVIDED WITH MULTIPLE MACHINES AND AT LEAST ONE SENSOR

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 56 days.

(21) Appl. No.: 15/416,636

(22) Filed: Jan. 26, 2017

(65) Prior Publication Data

US 2017/0220032 A1 Aug. 3, 2017

(30) Foreign Application Priority Data

Jan. 28, 2016 (JP) ................................ 2016-014452

(51) Int. Cl.
*G05B 19/418* (2006.01)

(52) U.S. Cl.
CPC ............ *G05B 19/41865* (2013.01); *G05B 2219/32258* (2013.01); *G05B 2219/32263* (2013.01); *Y02P 90/20* (2015.11); *Y02P 90/86* (2015.11)

(58) Field of Classification Search
CPC .......... G05B 19/41865; G05B 19/0426; G05B 2219/32263; G05B 2219/32258; Y02P 90/02; Y02P 90/30
USPC ........................................................ 700/21
See application file for complete search history.

(56) References Cited

U.S. PATENT DOCUMENTS

| 7,882,394 B2 * | 2/2011 | Hosek ................ G05B 23/0235 |
| | | 702/184 |
| 8,306,648 B2 | 11/2012 | Koishi et al. |
| 8,350,713 B2 | 1/2013 | Matsubara et al. |
| 8,417,363 B2 | 4/2013 | Erlandsson-Warvelin et al. |
| 8,473,270 B2 * | 6/2013 | Pannese ................ G05B 15/02 |
| | | 703/14 |
| 2004/0133310 A1 | 7/2004 | Watanabe et al. |
| 2004/0230980 A1 * | 11/2004 | Koyama ........... G05B 19/4148 |
| | | 718/103 |
| 2005/0075757 A1 * | 4/2005 | Haas .................. G01N 35/0092 |
| | | 700/245 |
| 2007/0108109 A1 * | 5/2007 | Erlandsson-Warvelin ................. |
| | | B25J 9/1694 |
| | | 209/629 |
| 2008/0228304 A1 * | 9/2008 | Maenishi ......... G05B 19/41805 |
| | | 700/108 |

(Continued)

FOREIGN PATENT DOCUMENTS

| CN | 1367413 A | 9/2002 |
| CN | 101644930 A | 2/2010 |
| CN | 102023608 | 4/2011 |

(Continued)

*Primary Examiner* — Ziaul Karim
(74) *Attorney, Agent, or Firm* — RatnerPrestia

(57) ABSTRACT

A cell controller of a system includes: a sensor management part that collectively manages information from a sensor; a workpiece management part that monitors at least one of the stroke and the state amount of a workpiece, the stroke and state amount being included in the information from the sensor; and a task management part that selects the workpiece to be handled based on the task request from a machine controller and at least one of the stroke and the state amount of the workpiece, and transmits information on the workpiece to be handled to the machine controller.

7 Claims, 7 Drawing Sheets

(56) References Cited

U.S. PATENT DOCUMENTS

2010/0305754 A1* 12/2010 Ban .................. B25J 9/0093
700/248
2012/0085291 A1* 4/2012 Conger ............ A01K 1/0047
119/419

FOREIGN PATENT DOCUMENTS

| JP | 2004185228 A | 7/2004 |
| JP | 2007528793 A | 10/2007 |
| JP | 2010280010 A | 12/2010 |
| JP | 4827731 B | 9/2011 |
| WO | WO 2010/149185 A1 | 12/2010 |

* cited by examiner

SYSTEM PROVIDED WITH MULTIPLE MACHINES AND AT LEAST ONE SENSOR

BACKGROUND OF THE INVENTION

1. Field of the Invention

The present invention relates to a system provided with multiple machines and at least one sensor. The present invention particularly relates to a system including at least one machine for handling multiple workpieces, at least one machine controller that controls the at least one machine, and at least one sensor that acquires data on multiple workpieces.

2. Description of the Related Art

In a system provided with multiple industrial machines, multiple controllers that control the respective industrial machines may activate the respective industrial machines in response to commands from a host controller. For example, in Japanese Patent No. 4827731, a master controller is connected to multiple machine controllers. The master controller receives position data acquired by multiple sensors and then transmits the position data to the machine controllers, allowing for the handling of workpieces.

In WO2010/149185, a network including multiple robot controllers is connected to a sensor network including multiple sensors. One of the robot controllers acts as the master controller of a system. In the event that the robot controller acting as the master controller malfunctions, another robot controller can act as the master controller.

SUMMARY OF THE INVENTION

In the case of a system provided with multiple sensors, the detection results and inspection results of the sensors are desirably combined to share tasks among industrial machines. In Japanese Patent No. 4827731, however, the detection results and inspection results of the sensors are not combined and thus detection results such as a position message and inspection result messages need to be separately processed, thereby increasing the load of programming.

Moreover, the master controller of Japanese Patent No. 4827731 is not connected to a host process controller for the master controller. This cannot allocate tasks in response to a request to increase or reduce a production amount in the system. Furthermore, in the case where one of the industrial machines is stopped for scheduled maintenance, tasks cannot be allocated when one of the industrial machines is stopped.

Moreover, the master controller of Japanese Patent No. 4827731 transmits, to the industrial machines, messages about workpieces to be machined, and receives machining results (statuses) in the industrial machines. The master controller then transmits the machining results to all of the other industrial machines. Thus, traffic may increase with the number of industrial machines, leading to a heavier load on the master controller of Japanese Patent No. 4827731.

Furthermore, in WO2010/149185, the sensor network including the sensors needs to be prepared in addition to the network including the robot controllers, disadvantageously increasing the cost of the system.

The present invention has been devised under these circumstances. An object of the present invention is to provide an inexpensive system that can prevent the load of a master controller from increasing with the number of industrial machines.

In order to attain the object, according to a first invention, a system includes at least one machine that handles multiple workpieces, at least one machine controller that controls the at least one machine, and at least one sensor that acquires data on the workpieces, the system further including a cell controller connected so as to communicate with the at least one machine controller and the at least one sensor, the cell controller including: a sensor management part that receives information from the at least one sensor and collectively manages the information; a workpiece management part that monitors at least one of a stroke and a state amount of the workpiece, the stroke and state amount being included in the information received by the sensor management part from the at least one sensor; and a task management part that receives a task request about the workpiece from the at least one machine controller, selects the workpiece to be handled based on the task request and at least one of the stroke and the state amount of the workpiece monitored by the workpiece management part, and transmits information on the workpiece to be handled to the at least one machine controller.

According to a second invention, in the first invention, the task management part further receives results of handling performed by the at least one machine based on the information on the workpiece to be handled.

According to a third invention, in the first or second invention, the sensor management part causes the at least one sensor to detect or inspect the workpiece according to at least one of the stroke and the state amount of the workpiece.

According to a fourth invention, in the first invention, the task management part selects the workpiece to be handled, based on at least one of a task-sharing ratio, a task condition, and an operation state of the at least one machine, and at least one production plan from a host controller connected to the cell controller.

According to a fifth invention, in the fourth invention, the host controller transmits process management information to the cell controller.

According to a sixth invention, in the fifth invention, the process management information is at least one of a change of a production amount and timing of maintenance of the at least one machine.

A detailed description regarding typical embodiments of the present invention shown in the accompanying drawings further clarifies the object, characteristics, advantages of the present invention and other objects, characteristics, and advantages of the present invention.

DETAILED DESCRIPTION

Figure 1:
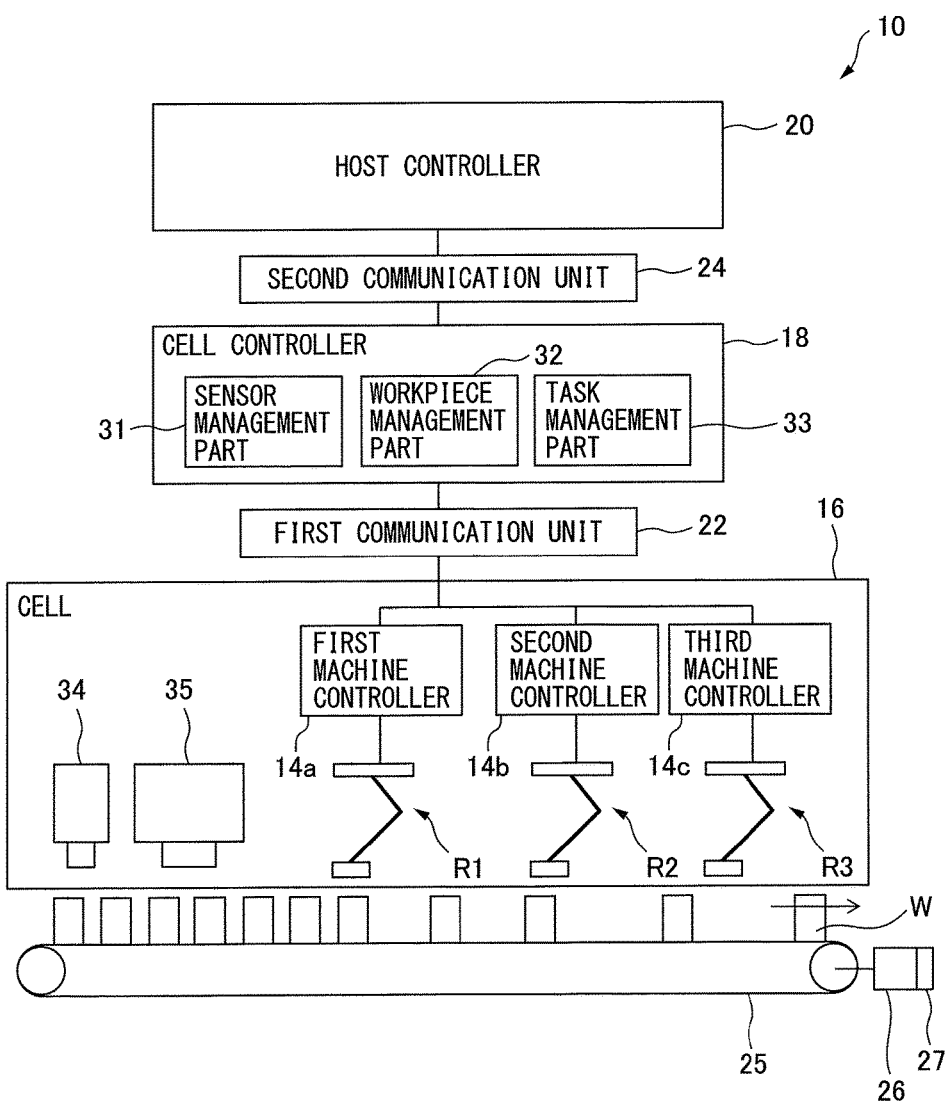
FIG. 1 is a block diagram showing a system according to the present invention.

Embodiments of the present invention will be described below with reference to the accompanying drawings. In these drawings, the same members are denoted with the same reference numerals. The scales of the drawings are optionally changed to facilitate understanding of the present invention.

FIG. 1 is a block diagram showing a system according to the present invention. A system 10 includes a cell 16 containing at least one, preferably two or more (three in FIG. 1) machines R1 to R3 and at least one (typically as many as the machines) machine controller (numerical controller) 14a to 14c for controlling the machines R1 to R3, a cell controller (cell controller) 18 configured to communicate with the machine controllers 14a to 14c, and a host controller 20 configured to communicate with the cell controller 18.

The cell 16 is a group of machines for performing a predetermined task. The machines R1 to R3 include, for example, machine tools, articulated robots, parallel link robots, manufacturing machines, and industrial machines. These machines may be identical to or different from one another. The machines R1 to R3 in FIG. 1 are parallel link robots that pick up multiple workpieces W and then move the workpieces W to other locations. In the present specification, the predetermined "task" performed by the machines R1 to R3 means that the workpieces W are picked up and moved to other locations. The machines R1 to R3 in the system 10 may perform other tasks.

The cell 16 includes a conveyor 25 that conveys the workpieces W (workpieces W1 to Wn (n is a natural number)) in the direction of an arrow, a motor 26 that drives the conveyor 25, and a rotation amount detector 27 that detects the amount of rotation of the motor 26. The cell 16 further includes multiple sensors 34 and 35 located on at least parts of the conveyor 25. The detection ranges of the sensors 34 and 35 may cover the overall conveyor 25.

The sensor 34 may be a position detector 34 that detects the positions of the workpieces W, for example, a camera with a low resolution. The position detector 34 and the rotation amount detector 27 of the motor 26 obtain a detection value in each unit time and transmit the value to the cell controller 18. Thus, the cell controller 18 can identify a stroke in each unit time of the workpieces W. And the cell controller 18 can also estimate a stroke between a unit time assuming a conveyor 25 moves at a constant speed, that is, strokes in each unit time of the workpieces W are almost same. In the present specification, "stroke" includes a position before and after movement of the workpiece and a direction of movement of the workpiece. If the detection range of the position detector 34 covers the overall conveyor 25, the strokes of the workpieces W are identified only by the detection results of the position detector 34.

The sensor 35 may be an inspection device 35 that inspects the workpieces W, for example, an appearance inspection device using a camera with a high resolution. Similarly, the inspection device 35 inspects the appearance of the workpiece W to obtain a state quantity of the workpiece in each unit time, and then transmits the quantity to the cell controller 18. Thus, the cell controller 18 can identify a state quantity for each of the workpieces W in each unit time. In the present specification, "state quantity" is a numeric value indicating the degree of contamination of the workpiece or a scratching amount on a surface of the workpiece. The machines R1 to R3 may not be caused to perform tasks if the inspection device 35 decides that the state amount of the workpiece is smaller than a predetermined value. If the position detector 34 is a camera, the camera may inspect the appearances of the workpieces W. In this case, the inspection device 35 may be omitted.

The machine controllers 14a to 14c can control the operations of the machines R1 to R3 and transmit data measured in the machines to the cell controller 18. In this case, the data also indicates whether the workpieces have been machined or not in the machines. Moreover, the data includes the task results of the workpieces handled by the machines.

In the present embodiment, the cell 16 can be installed in a factory for manufacturing products, whereas the cell controller 18 and the host controller 20 can be installed in a building different from the factory. In this case, the cell controller 18 and the machine controllers 14a to 14c can be connected via a network (first communication unit 22) such as an intranet. The host controller 20 can be installed in an office separated from a factory. In this case, the host controller 20 can be connected so as to communicate with the cell controller 18 via a network (second communication unit 24) such as the Internet. This configuration is merely exemplary and thus the first communication unit 22 may have any configuration as long as the cell controller 18 is connected so as to communicate with the machine controllers 14a to 14c. Moreover, the second communication unit 24 may have any configuration as long as the cell controller 18 is connected so as to communicate with and the host controller 20.

The cell controller 18 is configured to control the cell 16. Specifically, the cell controller 18 can successively transmit various commands to the machine controllers 14a to 14c and successively obtain the operation states (including the data) of the machines R1 to R3 from the machine controllers 14a to 14c.

As shown in FIG. 1, the cell controller 18 includes a sensor management part 31 that receives information from at least one of the sensors 34 and 35 and collectively manages the information. The sensor management part 31 may cause at least one of the sensors 34 and 35 to detect or inspect the workpiece W according to at least one of the stroke and the state amount of the workpiece W.

The cell controller 18 further includes a workpiece management part 32 that monitors at least one of the stroke and the state amount of the workpiece W. The stroke and the state amount are included in information received by the sensor management part 31 from at least one of the sensors 34 and 35. The cell controller 18 further includes a task management part 33 that receives a task request regarding the workpiece W from each of the machine controllers 14a to 14c, selects the workpiece W to be handled based on the task request and at least one of the stroke and the state amount of the workpiece W monitored by the workpiece management part 32, and transmits information on the workpiece W to be handled (hereinafter may be simply referred to as "workpiece information") to the machine controllers 14a to 14c.

The host controller 20 is, for example, a personal computer that sets up an operation plan for a factory having the cell 16. The operation plan is process management information including a change in a production amount in the system 10 and the timing of maintenance of the individual machines. The process management information is transmitted to the cell controller 18. A change in the production amount means a change in the number of workpieces W picked up from the conveyor 25 by the machines R1 to R3 in each unit time.

Figure 2:
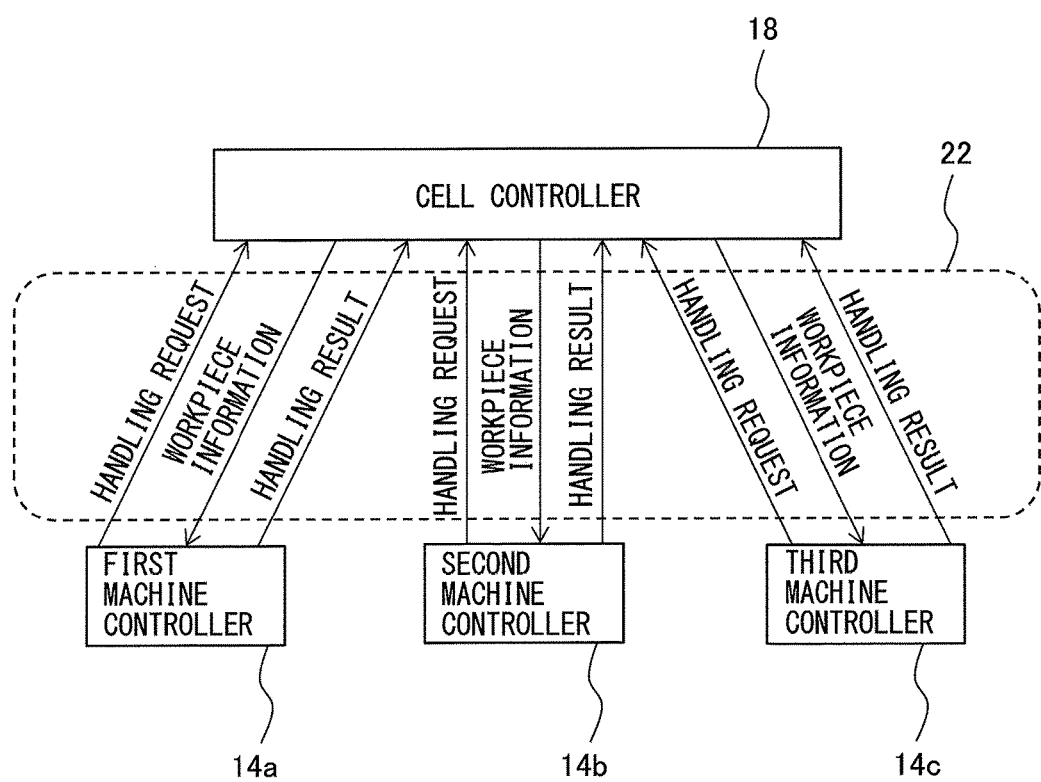
FIG. 2 is a partial enlarged view showing the relationship between a cell controller and a machine controller.

FIG. 2 is a partial enlarged view showing the relationship between the cell controller and the machine controller. In FIG. 2, the cell 16 is not shown. As shown in FIG. 2, a task request regarding the workpiece W is supplied from each of the machine controllers 14a to 14c to the cell controller 18 through the first communication unit 22.

The workpiece information determined by the task management part 33 is supplied from the cell controller 18 to the machine controllers 14a to 14c through the first communication unit 22. The workpiece information is information on the specific workpiece W to be handled by the machines R1 to R3. For example, information on the workpieces W1 and W2 is supplied to the machine controller 14a, information on the workpieces W3 and W4 is supplied to the machine controller 14b, and information on the workpieces W5 and W6 is supplied to the machine controller 14c.

As shown in FIG. 2, the machine controllers 14a to 14c handle the workpieces based on the workpiece information and then transmit the task results to the cell controller 18 through the first communication unit 22. The task results indicate whether the workpieces W have been successfully handled or not.

As described above, in the present invention, the cell controller 18 including the sensor management part 31, the workpiece management part 32, and the task management part 33 substantially acts as a master controller that collectively controls the cell 16 of the system 10.

The task management part 33 of the cell controller 18 transmits information on the workpieces W to be handled to the machine controllers 14a to 14c based on at least one of the stroke and the state amount of the workpiece W and task requests from the machine controllers 14a to 14c. As shown in FIG. 2, in the present invention, the task results in the machines R1 to R3 are not transmitted to all of the other machines. Specifically, the machine controller 14a does not recognize the task results of the machines R2 and R3 of the other machine controllers 14b and 14c.

Thus, even if the number of machines R1 to R3 increases in the present invention, the traffic does not increases considerably, thereby suppressing a rise in the load of the cell controller 18. The present invention further eliminates the need for a sensor network, unlike in the related art, allowing the system 10 to have an inexpensive configuration.

Figure 3:
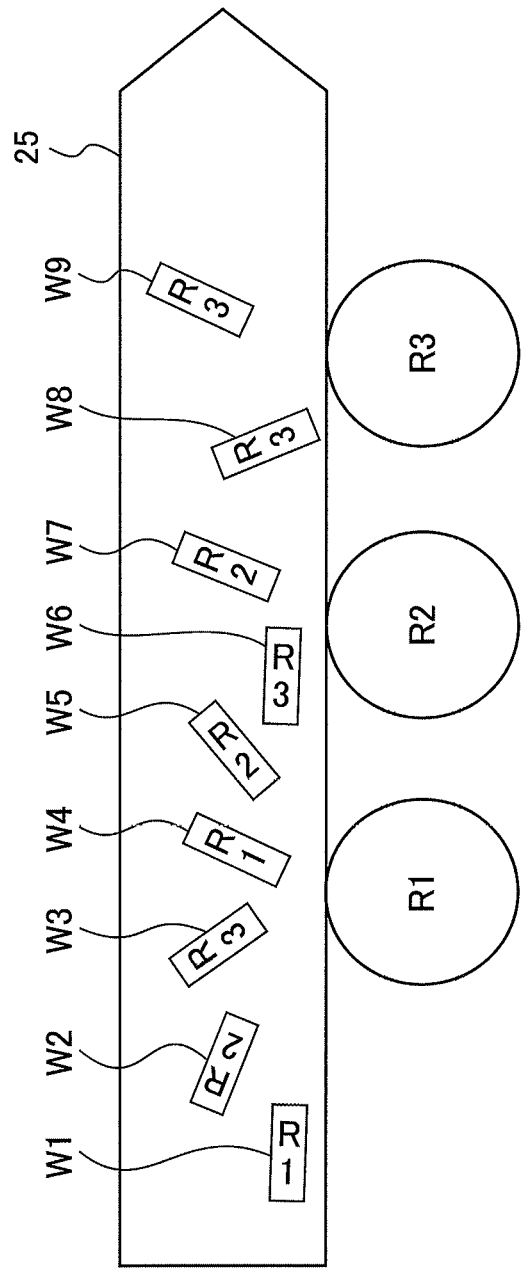
FIG. 3 is a schematic diagram showing a first embodiment of the system according to the present invention.

FIG. 3 is a schematic diagram showing a first embodiment of the system according to the present invention. In FIG. 3 and subsequent other drawings, multiple machines, for example, the three machines R1 to R3, are sequentially disposed along the conveying direction of the conveyor 25. Moreover, in FIG. 3, multiple workpieces W1 to W9 are sequentially disposed from the upstream end of the conveyor 25 in the conveying direction substantially in the same manner as in the other drawings, which will be discussed later.

In the embodiment shown in FIG. 3, a task request is supplied to the cell controller 18 such that the machines R1 to R3 share tasks in a ratio of 1:1:1. Specifically, the most downstream machine R3 in the conveying direction is first set so as to handle all of the workpieces W located between the most downstream machine R3 and the machine R2 located directly upstream of the machine R3. In other words, the machine controller 14c of the machine R3 supplies a task request to the cell controller 18 to handle all the workpieces W conveyed to the machine R3.

Subsequently, the machine controller 14b of the machine R2 supplies a task request to the cell controller 18 to handle one-half of the workpieces conveyed to the machine R2. After that, the machine controller 14a of the machine R1 supplies a task request to the cell controller 18 to handle one-third of the workpieces conveyed to the machine R1. In other words, the most upstream machine R1 supplies a task request to the cell controller 18 to handle the workpieces W. The number of workpieces W is the inverse of the number of machines.

The settings of the task requests allow the machines R1 to R3 to uniformly share tasks. Based on the task request and the stroke of the workpiece W or based on the task request and both of the stroke and state amount of the workpiece W, the task management part 33 determines information on the workpieces W to be handled by the machines R1 to R3 and supplies the information to the machine controllers 14a to 14c.

In this case, as shown in FIG. 3, workpiece information on the workpieces W1, W4, and W7 is supplied to the machine controller 14a, workpiece information on the workpieces W2, W5, and W8 is supplied to the machine controller 14b, and workpiece information on the workpieces W3, W6, and W9 is supplied to the machine controller 14c.

Thus, in the present invention, the task management part 33 of the cell controller 18 selects the workpieces W to be handled by the machines R1 to R3 as described above based on the task-sharing ratio. This can optimize the allocation of the workpieces W to the machines R1 to R3 in the present invention.

Figure 4:
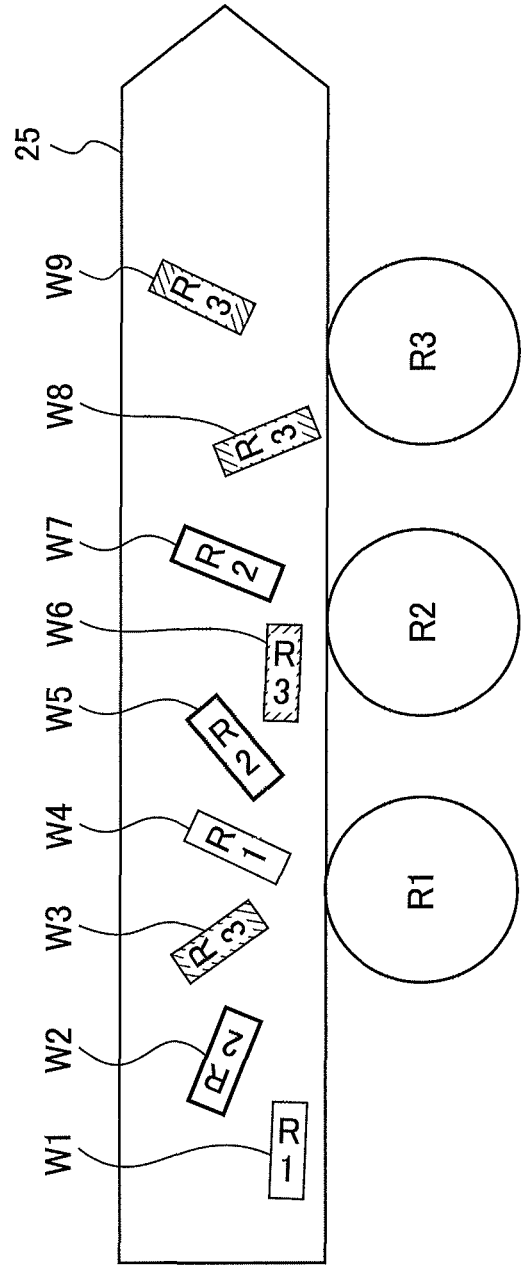
FIG. 4 is a schematic diagram showing a second embodiment of the system according to the present invention.

FIG. 4 is a schematic diagram showing a second embodiment of the system according to the present invention. In FIG. 4, workpieces W1 to W9 include workpieces Wa to Wc of first to third types. In the embodiment of FIG. 4, a task management part 33 determines workpiece information under the task conditions. The workpieces Wa to Wc of the first to third types can be identified by an inspection device 35 and vary in, for example, color or surface roughness.

In this case, a machine controller 14c of a machine R3 supplies a task request to a cell controller 18 to handle the workpiece Wc. Subsequently, a machine controller 14b of a machine R2 supplies a task request to the cell controller 18 to handle the workpiece Wb. A machine controller 14a of a machine R1 supplies a task request to the cell controller 18 to handle the workpiece Wa.

In other words, in the presence of multiple kinds of workpieces, at least one machine, for example, the machine R3 handles only one kind of workpiece W. Alternatively, one of the machines, for example, the machine R2 may handle the workpieces Wa and Wb.

As described above, the workpieces Wa, Wb, and Wc are identified by the inspection device 35 and the identification results are included in a state amount. Based on the task request and both of the stroke and the state amount of the workpiece W, the task management part 33 determines information on the workpieces W to be handled by the machines R1 to R3 and then supplies the information to the machine controllers 14a to 14c.

As shown in FIG. 4, the workpiece Wa of the first type corresponds to the workpieces W1 and W4, the workpiece Wb of the second type corresponds to the workpieces W2, W5, and W7, and the workpiece Wc of the third type corresponds to the workpieces W3, W6, W8, and W9. Thus, in this case, workpiece information on the workpieces W1 and W4 is supplied to the machine controller 14a, workpiece information on the workpieces W2, W5, and W7 is supplied to the machine controller 14b, and workpiece information on the workpieces W3, W6, W8, and W9 is supplied to the machine controller 14c. Thus, in the second embodiment, the workpieces W to be handled by the machines R1 to R3 can be properly selected based on the task conditions.

Figure 5:
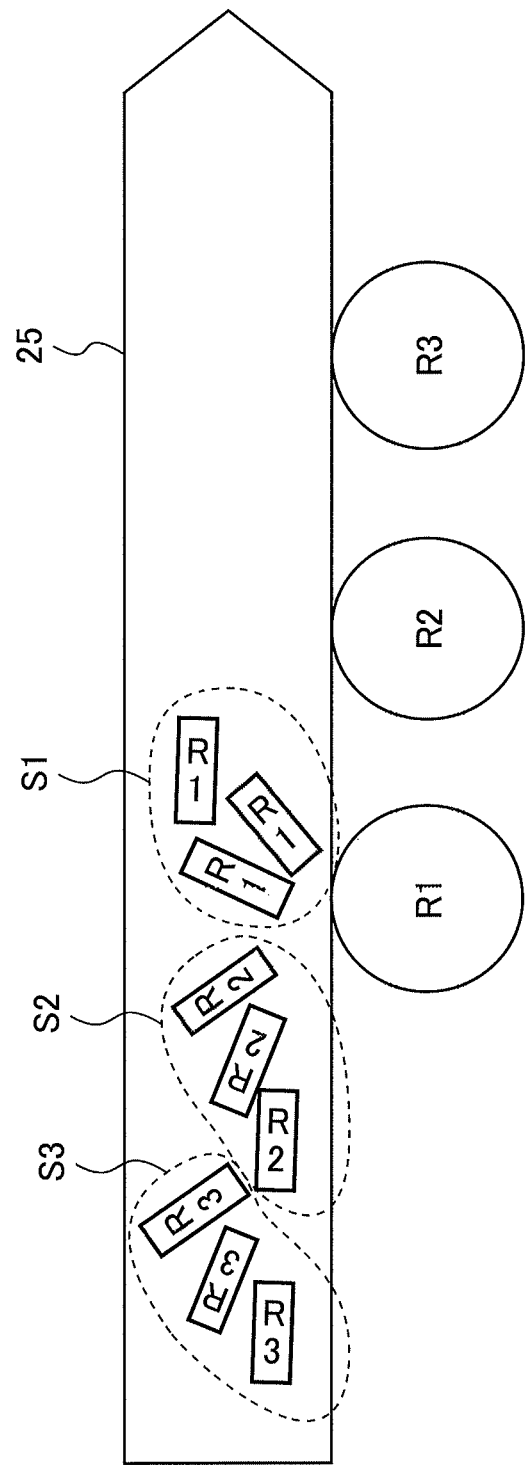
FIG. 5 is a schematic diagram showing a third embodiment of the system according to the present invention.

FIG. 5 is a schematic diagram showing a third embodiment of the system according to the present invention. In FIG. 5, machines R1 to R3 each have a hand, allowing three holding mechanisms to hold multiple workpieces, e.g., three respective workpieces W.

As described above, a stroke of the workpiece W detected by a sensor 34 includes a position before and after a movement of the workpiece and a direction of movement of the workpiece. Moreover, the sensor 34 obtains the strokes of all of the workpieces W and thus a group of three workpieces at the shortest distance can be extracted from the workpieces with reference to the stroke. As shown in FIG. 5, groups S1 to S3 are extracted in the third embodiment. The machines R1 to R3 consecutively hold the workpieces included in the groups S1 to S3, by means of the holding mechanisms, and thus the machines R1 to R3 can hold the three workpieces W with a minimum movement. In the third embodiment, a task management part 33 determines workpiece information, strictly speaking, workpiece group information under the task conditions.

As in the first embodiment, a machine controller 14c of the most downstream machine R3 supplies a task request to a cell controller 18 to handle all of the groups conveyed to the machine R3. Subsequently, a machine controller 14b of the machine R2 supplies a task request to the cell controller 18 to handle one-half of the groups conveyed to the machine R2. After that, a machine controller 14a of the machine R1 supplies a task request to the cell controller 18 to handle one-third of the groups conveyed to the machine R1. In other words, the most upstream machine R1 supplies a task request to the cell controller 18 to handle the groups. The number of groups is the inverse of the number of machines.

Based on the task request and both of the stroke and state amount of the workpiece W, the task management part 33 determines information on the groups to be handled by the machines R1 to R3 and supplies the information to the machine controllers 14a to 14c.

In this case, as shown in FIG. 5, workpiece information included in the group S1 is supplied to the machine controller 14a, workpiece information included in the group S2 is supplied to the machine controller 14b, and workpiece information included in the group S3 is supplied to the machine controller 14c. Also in this case, it is evident that substantially the same effect can be obtained as in the first embodiment.

Figure 6:
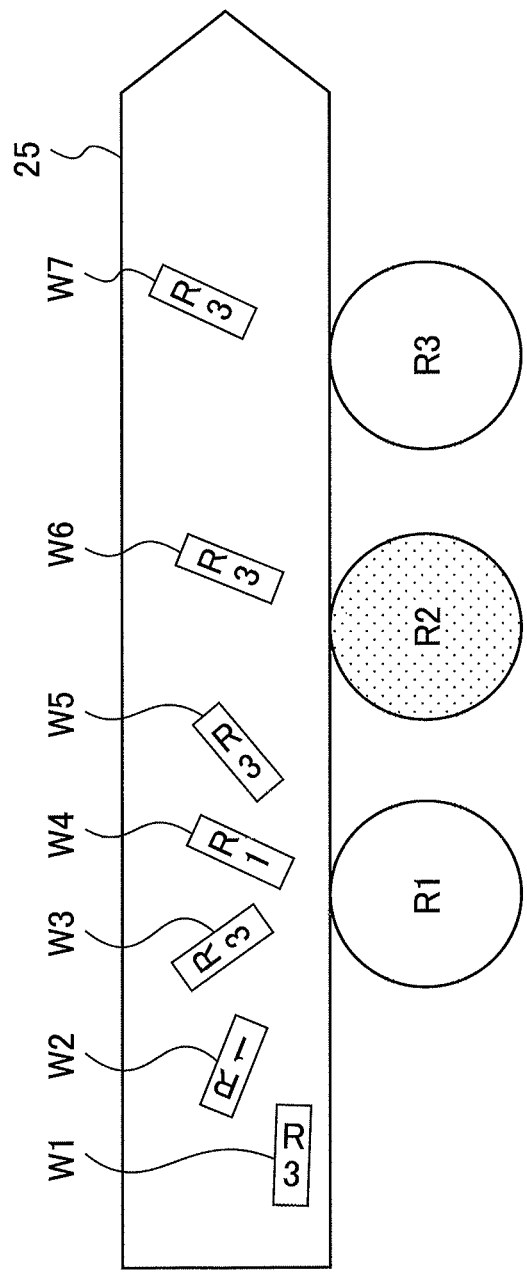
FIG. 6 is a schematic diagram showing a fourth embodiment of the system according to the present invention.

FIG. 6 is a schematic diagram showing a fourth embodiment of the system according to the present invention. In FIG. 6, multiple workpieces W1 to W7 are sequentially illustrated from the upstream end of a conveyor 25 in the conveying direction. In this case, as in the first embodiment, a machine controller 14c of a most downstream machine R3 supplies a task request to a cell controller 18 to handle all groups conveyed to the machine R3. The same task is performed on the other machines R1 and R2 as in the first embodiment. In other words, the machines R1 to R3 uniformly share tasks.

It is assumed that process management information set up by a host controller 20 includes the timing of maintenance of one machine, for example, the machine R2. This prevents the machine R2 from handling the workpieces in an operating condition during maintenance. Thus, based on this operating condition, the task management part 33 functions so as to allocate the tasks of the machine R2 to the other machines R1 and R3. Specifically, the tasks of the machine R2 are uniformly allocated to the other machines R1 and R3.

Thus, as shown in FIG. 6, workpiece information on the workpieces W2 and W4 is supplied to the machine controller 14a and workpiece information on the workpieces W1, W3, W5, W6, and W7 is supplied to the machine controller 14c.

As a matter of course, workpiece information is not supplied to the machine controller 14b.

As described above, in the fourth embodiment, the tasks of the machine R2 are reallocated to the other machines R1 and R3. It would be understood that the workpieces can be optimally allocated and a system 10 can be continuously operated even during the maintenance of the machine R2. This also holds true when the machines are stopped for a reason other than maintenance during the maintenance of the other machines R1 and R3.

Figure 7:
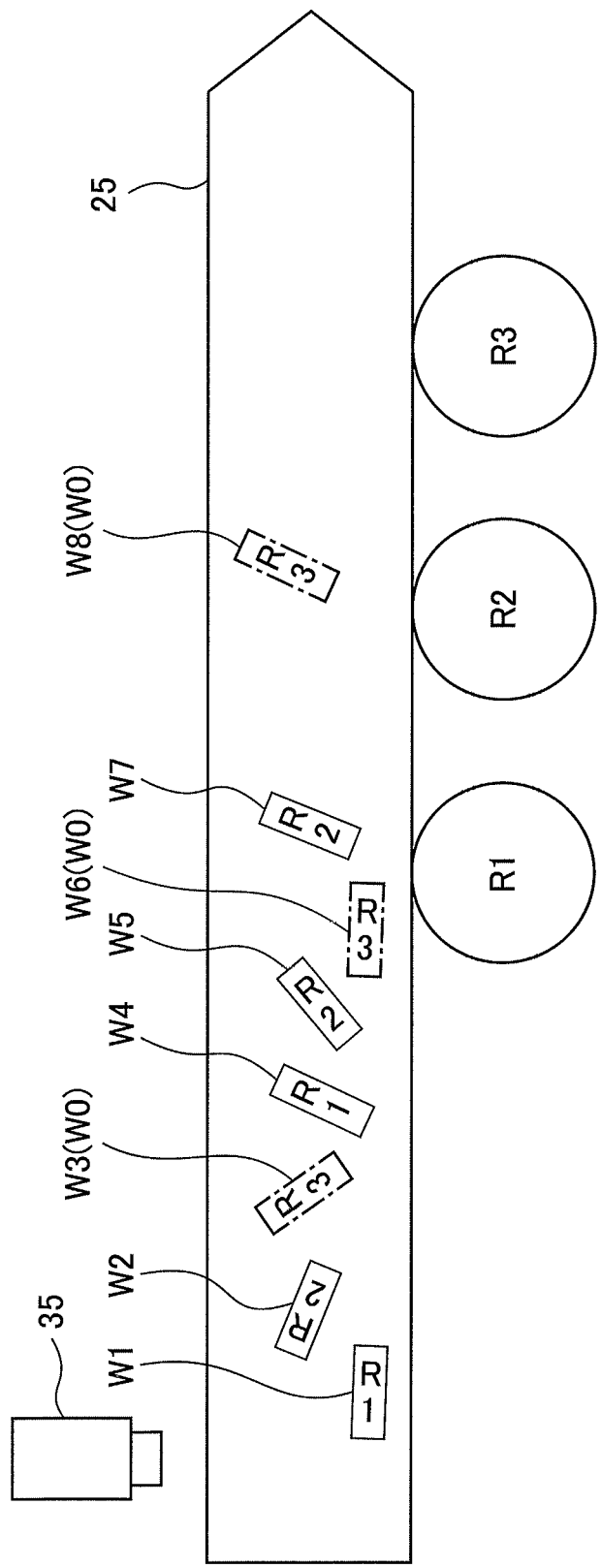
FIG. 7 is a schematic diagram showing a fifth embodiment of the system according to the present invention.

FIG. 7 is a schematic diagram showing a fifth embodiment of the system according to the present invention. FIG. 7 shows an inspection device 35. In this case, a machine controller 14c of a most downstream machine R3 operates under the task condition where only at least one workpiece W0 is handled if the inspection device 35 determines that the state amount of the workpiece is smaller than a predetermined value. The machine controller 14c supplies such a task request to a cell controller 18.

A machine controller 14b of a machine R2 supplies a task request to the cell controller 18 to handle all of the workpieces conveyed to the machine R2 other than the workpiece W0. A machine controller 14a of a machine R1 supplies a task request to the cell controller 18 to handle one-half of the workpieces conveyed to the machine R1.

Based on the task request and both of the stroke and state amount of the workpiece W, a task management part 33 determines information on workpieces W to be handled by the machines R1 to R3 and then transmits the information to the machine controllers 14a to 14c.

As shown in FIG. 7, workpiece information on workpieces W1 and W4 is supplied to the machine controller 14a and information on workpieces W2, W5, and W7 is supplied to the machine controller 14b. Moreover, if the inspection device 35 decides that the state amounts of workpieces W3, W6, and W8 are smaller than a predetermined value, workpiece information on the workpieces W3, W6, and W8 is supplied to the machine controller 14c. In this case, the task management part 33 of the cell controller 18 can properly select the workpieces to be handled based on the task condition.

In some of the embodiments, both of the sensor 34 and the inspection device 35 may be used. In this case, the output results of the sensor 34 and the inspection device 35 are preferably combined and supplied to the cell controller 18. This proves that tasks can be optimized without considerably increasing traffic. Moreover, some of the embodiments may be optionally combined within the scope of the invention.

Effect of the Invention

In first to fifth inventions, the task management part of an independent cell controller corresponding to a master controller determines information on workpieces to be handled, based on at least one of the stroke and state amount of the workpiece and a task request from at least one machine controller, and then the task management part transmits the information to the at least one machine controller. At this point, the task results in at least one machine are not transmitted to all other machines. Thus, even if the number of machines, e.g., industrial machines, increases, traffic does not increase considerably, thereby suppressing a rise in the load of the cell controller. This further eliminates the need for a sensor network, allowing the system to have an inexpensive configuration. Moreover, workpieces to be handled are selected based on at least one of the stroke and state amount of the workpiece and a task request of at least one machine, allowing for proper selection of the workpieces.

The present invention has been described according to the typical embodiments. It would be understood that a person skilled in the art can make the above and other various changes, omissions, and additions without departing from the scope of the present invention.

The invention claimed is:

1. A system comprising:
   a plurality of machines that handle multiple workpieces;
   a plurality of machine controllers that each control at least one machine of the plurality of machines;
   at least one sensor that acquires data on the workpieces; and
   a cell controller connected so as to communicate with the plurality of machine controllers and the at least one sensor, the cell controller comprising:
      a sensor management part that receives information from the at least one sensor and collectively manages the information;
      a workpiece management part that monitors a state amount indicating only a quality of the workpiece and monitors a stroke indicating a position or direction of movement of the workpiece, the stroke and state amount being included in the information received by the sensor management part from the at least one sensor; and
      a task management part that:
         receives a task request regarding the workpiece from the plurality of machine controllers, selects the workpiece to be handled by each of the plurality of machines from the multiple workpieces based on the task request and the state amount and the stroke of the workpiece monitored by the workpiece management part, and
         transmits information on the selected workpiece only to the machine controller handling the selected workpiece,
      wherein the machine controller handling the selected workpiece:
         1) receives the transmitted information,
         2) controls the at least one machine of the plurality of machines based on the information, and
         3) transmits task results regarding the handling of the workpiece to the cell controller without transmitting the task results to any of the machine controllers.

2. The system according to claim 1, wherein the task management part further receives results of handling performed by each of the plurality of machines based on the information on the workpiece to be handled.

3. The system according to claim 1, wherein the sensor management part causes the at least one sensor to detect or inspect the workpiece according to the state amount and the stroke of the workpiece.

4. The system according to claim 1, wherein the task management part selects the workpiece to be handled, based on at least one of a task-sharing ratio, a task condition, and an operation state of the plurality of machine, and at least one production plan from a host controller connected to the cell controller.

5. The system according to claim 4, wherein the host controller transmits process management information to the cell controller.

6. The system according to claim 5, wherein the process management information is at least one of a change in a production amount and timing of maintenance of the plurality of machine.

7. The system according to claim 1, wherein the task management part receives task results regarding the handling of the workpiece from the plurality of machine controllers.

* * * * *